United States Patent [19]

Ashbee et al.

[11] Patent Number: 4,511,242

[45] Date of Patent: Apr. 16, 1985

[54] ELECTRONIC ALIGNMENT FOR A PAPER PROCESSING MACHINE

[75] Inventors: William H. Ashbee; Donovan M. Janssen, both of Boulder; Ronald J. Martin, Loveland; William S. Seaward, Boulder, all of Colo.

[73] Assignee: International Business Machines Corporation, Armonk, N.Y.

[21] Appl. No.: 452,233

[22] Filed: Dec. 22, 1982

[51] Int. Cl.[3] .......................... B65H 9/20; B65H 9/00; G03B 27/00; G03G 15/00

[52] U.S. Cl. ................................ 355/14 C; 355/3 R; 355/3 SH; 355/14 R; 355/14 SH; 271/227; 198/394

[58] Field of Search ................ 350/255; 271/227, 228, 271/245, 246, 247, 253, 254, 255, 261, 137, 225, 226, 260, 308; 355/3 R, 14 C, 3 SH, 14 R, 14 SH; 198/394, 395

[56] References Cited

U.S. PATENT DOCUMENTS

| | | | |
|---|---|---|---|
| 4,310,236 | 1/1982 | Connin | 355/14 SH |
| 4,322,813 | 3/1982 | Howard et al. | 355/14 C X |
| 4,322,847 | 3/1982 | Dodge et al. | 355/14 C X |
| 4,372,668 | 2/1983 | Malachowski et al. | 355/3 SH X |
| 4,416,534 | 11/1983 | Kluger | 355/3 SH X |
| 4,417,801 | 11/1983 | Eisemann | 355/3 SH |
| 4,419,003 | 12/1983 | Fujie et al. | 355/3 SH X |
| 4,421,264 | 12/1983 | Arter et al. | 355/3 SH X |
| 4,428,666 | 1/1984 | Phelps et al. | 355/3 SH X |
| 4,428,667 | 1/1984 | Phelps et al. | 355/3 SH |
| 4,433,909 | 2/1984 | Goes In Center et al. | 355/3 SH X |
| 4,436,403 | 3/1984 | Rhodes, Jr. et al. | 355/3 SH |
| 4,438,917 | 3/1984 | Janssen et al. | 271/227 |

FOREIGN PATENT DOCUMENTS

| | | |
|---|---|---|
| 0027266 | 4/1981 | European Pat. Off. . |
| 0077454 | 4/1983 | European Pat. Off. . |
| 0087912 | 9/1983 | European Pat. Off. . |

OTHER PUBLICATIONS

IBM Tech. Disc. Bul., "Servo-Controlled Paper Gate", J. L. Cochran and J. A. Valent, vol. 22, No. 12, May 1980, pp. 5268-5269.

IBM Tech. Disc. Bul., "Copier Alignment", G. S. Herring and R. J. Perkins, vol. 23, No. 9, Feb. 1981, pp. 4009-4010.

"Detecting Mechanism for Skew Feeding of Blank Form", K. Hatasawa, Patent Abstracts of Japan, vol. 5, No. 162, 10-81.

"Automatic Paper-Sheet Feeding Apparatus", M. Shitochi, Patent Abstracts of Japan, vol. 4, No. 13, 1-30-80, p. 41M90.

*Primary Examiner*—A. T. Grimley
*Assistant Examiner*—Jerry Flower
*Attorney, Agent, or Firm*—C. E. Rohrer

[57] ABSTRACT

Electronic alignment of paper feeding components in a machine such as an electrophotographic copier machine is achieved by placing an original master containing vernier calibrations on the document glass and a target master containing vernier calibrations in the copy paper bin. Thereupon, the machine is operated to produce a copy of the original master onto the target master producing a double set of vernier calibrations on the target master, which, when compared, provides information relating to skew angle, side edge relationship and leading edge alignment of the image to the copy paper. The vernier calibrations provide data which are keyed into a microprocessor controlled copy feeding servo mechanism to correct copy paper position and remove misalignment. The operation is repeated for various combinations of paper feed paths with techniques of original document placement and for duplex operation so that the copy paper matches image position for all modes of copier operation. For printer mode of operation, the master vernier is printed to produce the needed image.

In addition, sensors are located in the copy paper path to automatically correct for deviations in the copy sheet feeding unit, caused by wear, for example, over a period of time.

Sensors are also located in the document feeder so that corrections in the position of the copy paper may be made on an individualized and dynamic basis to electronically correct for misalignment of individual originals on the document glass.

41 Claims, 8 Drawing Figures

35

ELECTRONIC ALIGNMENT FOR A PAPER PROCESSING MACHINE

This disclosure relates to electrophotographic machines and more particularly to electronic alignment of machine components to cause image receiving sheets to accurately mate with the image.

BACKGROUND OF THE INVENTION

In electrophotographic machines, copies of documents or other subjects are produced by creating an image of the subject on a photoreceptive surface, developing the image and then fusing the image to copy material. In machines which utilize plain bond image receiving paper or other ordinary image receiving material not specially coated, the electrophotographic process is of the transfer type where a photoreceptive material is placed around a rotating drum or arranged as a belt to be driven by a system of rollers. In the typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays reflected from the document to be copied. Since white areas of the original document reflect large amounts of light, the photoreceptive material is discharged in white areas to relatively low levels while the dark areas continue to contain high voltage levels even after exposure. In that manner, the photoreceptive material is caused to bear a charge pattern which corresponds to the printing, shading, etc. present on the original document and is therefore, an electrostatic image of that document. Electrophotographic machines may also be organized to provide a printing function where the image on the photoreceptive surface results from character generation rather than from an optical review of an original document. Character generation may be produced, for example, by driving a light generating source from information held in digital memory. The light generating source may be a laser gun, an array of light-emitting diodes, light modulators, etc. which direct light rays to the photoreceptor and cause it to bear a charge pattern which is an image of the information used to drive the light generating source.

After producing an image on the photoreceptor, the next step in the process is to move the image to a developing station where developing material called toner is placed on the image. This material may be in the form of a black powder which carries a charge opposite in polarity to the charge pattern on the photoreceptor. Because of the attraction of the oppositely charged toner, it adheres to the surface of the photoreceptor in proportions related to the shading of the original. Thus, black character printing should receive heavy toner deposits, white background areas should receive none, and gray or otherwise shaded half-tone character portions of the original should receive intermediate amounts.

In a transfer machine, the developed image is moved from the developer to a transfer station where image receiving material, usually copy paper, is juxtaposed to the developed image on the photoreceptor. A charge is placed on the back-side of the copy paper so that when the paper is stripped from the photoreceptor, the toner material is held on the paper and removed from the photoreceptor. Unfortunately, the transfer operation seldom transfers 100% of the toner from the receptor to the copy paper. Toner remaining on the photoreceptor after transfer is called residual toner.

The remaining process steps call for permanently bonding the transferred toner material to the copy paper and cleaning the residual toner left on the photoreceptor so that it can be reused for subsequent copy production.

In the cleaning step, it is customary to pass the photoreceptor under a preclean charge generating station to neutralize the charged areas on the photoreceptor. The photoreceptor may also be moved under an erase lamp to discharge any remaining charge. In that manner, the residual toner is no longer held by electrostatic attraction to the photoreceptive surface and thus it can be more easily removed at a cleaning station.

In order to avoid overburdening the cleaning station, it is customary to remove all charge present on the photoreceptive surface outside of the image area prior to the development step. This is usually done by using an interimage erase lamp to discharge photoreceptive material between the trailing edge of one image and the leading edge of the next. Also, edge erase lamps are used to erase charge along the edges of the photoreceptor outside of the image area. For example, if the original document is $8.5\times11$ inches in size, and if a full sized reproduction is desired, the dimensions of the image on the photoreceptor will also be $8.5\times11$ inches. The interimage and edge erase lamps remove charge outside of the $8.5\times11$-inch image area.

In a nontransfer machine, specially prepared paper is used where the copy paper itself carries a coating of photosensitive material. By utilizing that technique, the image is electrostatically painted directly on the copy paper. The copy paper is sent through a developer and then to a fuser for permanent bonding. Machines of this type avoid the residual toner problem and therefore there is no need for cleaning stations, erase lamps, preclean generating coronas, etc. However, the resulting copy paper with its special photosensitive coating is much more expensive than plain bond copy paper and the special coating is considered to detract from the resulting product. As a consequence, nontransfer machines are usually favored only for low volume applications or where quality product is not essential.

In addition to the fundamental mechanisms used for producing a copy or print, modern electrophotographic machines have been developed with many features which are designed to ease the difficulty of using the machines. For example, semiautomatic document feeders (SADF), automatic document feeders (ADF) including recirculating automatic document feeders (RADF) ease the entry of originals. Collators are often added to the base machine so that collated sets of copies can be automatically produced. Many machines have a duplex function so that copies can be produced on both sides of the copy sheet. Other features add to machine versatility such as the production of copies which are a reduced or magnified version of the original document. Other features improve copy quality such as mechanisms for controlling the concentration of toner in machines which utilize a carrier/toner development mix. Many modern electrophotographic machines are controlled by microprocessors rather than by hardwired analog or digital logic. The use of microprocessors has enabled the addition of many new innovative functions at low cost such as, for example, error logs and automatic diagnostic capabilities to ease troubleshooting and improve maintenance. Microprocessor routines have also aided in the establishment of a degree of "artificial intelligence" to anticipate the operators needs in document feed operations, collate, and other areas. Additionally, microprocessors have made economical the addition of innovative functions such as the provision of separator sheets between different sets of copies within a collator.

The invention to be described herein makes use of servo mechanisms and microprocessor control to provide an electrophotographic machine with the intelligence to align its own components so that image receiving material, for example, an 8.5×11-inch sheet, can mate precisely with an 8.5×11-inch image area without the need for precision mechanical alignment of several paper path parts, image producing parts and document feeder parts as has been done previously.

CROSS REFERENCE TO RELATED PATENT APPLICATIONS

The electronic alignment method and apparatus of the invention, in a specific embodiment described herein, makes use of a copy paper path in which the copy paper is moved forward under the control of a mechanism such as the "dual motor aligner" described in U.S. Pat. No. 4,438,917 incorporated herein by reference. The dual motor aligner is a microprocessor-controlled servo mechanism through which a receiving sheet is electronically positioned and aligned prior to sending the receiving sheet to a processing station such as the transfer station of an electrophotographic machine. With the dual motor aligner, a receiving sheet is moved sideways and rotated by two separately driven feed rollers so that the receiving sheet achieves a specific alignment without the need of mechanical reference edges. The amount of sidewise and rotational movement to reference the document and remove skew depends upon the amount of misalignment of the receiving sheet which is sensed by sensors located in the copy paper path. Information from these sensors is processed by the microprocessor to operate the separately driven paper feed rollers at different speeds in order to achieve the correct receiving sheet alignment. Additionally, the sensors gauge the forward movement of the receiving sheet so that its leading edge arrives at the transfer station in synchronism with the leading edge of the image. In that manner, the dual motor aligner does away with mechanical gating devices.

U.S. Pat. No. 4,455,018 describes a document feeding mechanism wherein sensors control the movement of the original document to a specific position on the document glass which is not necessarily located against any particular mechanical reference or registration edges. The invention to be described herein can make use of information derived from sensors located in the document feed path to control the position of the receiving sheet in the copy paper path.

SUMMARY OF THE INVENTION

In one aspect of this invention, method and means are provided for causing an image receiving sheet to mate with an image produced by an electrophotographic machine or the like without tedious, time-consuming and expensive mechanical adjustment of various mechanisms in the copy paper path and/or image producing system during the manufacturing process. The invention is of particular value on a manufacturing line but can also be utilized by maintenance personnel to correct alignment problems if such problems develop in the field. In addition, the invention can be used to automatically correct for misalignment problems as they develop.

In another aspect of the invention, the necessity of precision positioning of original documents on a document glass is removed by enabling an automatic electronic adjustment of the position of the receiving sheet so that the receiving sheet mates with the image despite misalignment of the original on the document platen.

In still another aspect of the invention, in a machine with duplex capability, the position of the duplex sheet is corrected even though different correction factors are needed from those used with simplex. This concept extends to the provision of different correction factors, as needed, for different situations such as positioning an original by an RADF, an ADF, an SADF, or by manual placement.

In its most basic form, the invention makes use of a mechanism such as a dual motor aligner and provides method and means to align the relative position of an image receiving sheet with an image on a photoconductor by measuring the spatial difference between the actual position of the image on the sheet with a nominal position. This may be accomplished through use of a reference pattern on a master image receiving sheet with a reference pattern on an original master in order to easily generate correction factors representative of the spatial difference and utilizing those correction factors to electronically control the relative position of receiving sheets and the image so that the sheets are fed to the processing station in synchronism with the latent image on the photoreceptor. In that manner, precision adjustment of mechanical parts is eliminated. Additionally, feedback apparatus can be added so that wear within the system can be automatically compensated and any other factors causing dynamic misalignment can be compensated.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

A. The Electrophotographic Machine

Figure 1:
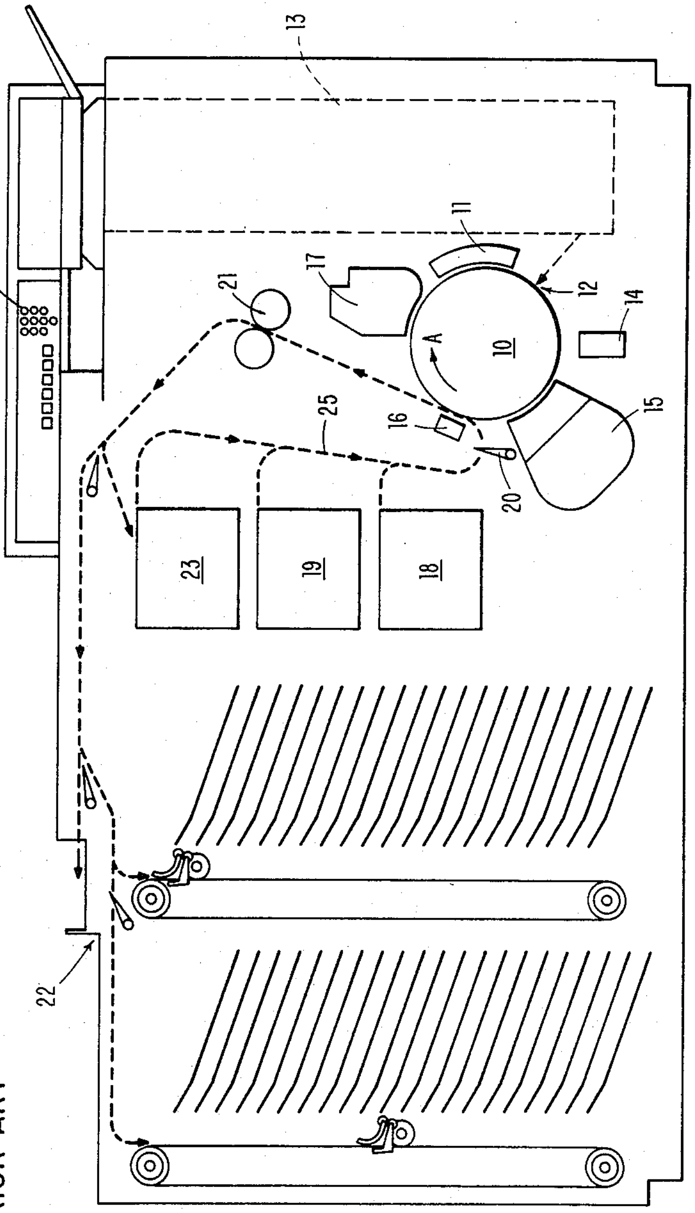
FIG. 1 PRIOR ART
FIG. 1 shows the copy paper path in an electrophotographic copier or printing machine of the transfer type.

FIG. 1 shows the copy paper path of a typical electrophotographic machine of the transfer type. In this machine, a drum 10 rotates in the direction A past a corona generator 11 which places a relatively uniform charge across the photoreceptive surface of the drum. Rotation of the drum brings the charged photoreceptive surface past an imaging or exposure station 12 where light rays create the desired image on the photoreceptive surface. These light rays are produced by module 13 which may be an optics module in the case of a copy machine, or it could be an electronically controlled printhead module in the case of a printer. Erase lamps 14 erase the charged area of the photoreceptor outside of the defined image area and the image is then developed by developer 15. Transfer to a sheet of image receiving material occurs under the influence of transfer corona 16. The photoreceptive surface continues to rotate to cleaning station 17 where the photoreceptor is cleaned and prepared for the next copying operation.

Image receiving sheets, usually paper, are located in bins 18 and 19 and are sequentially fed from either one of those bins into the copy paper path 25 to gate 20. At the proper time in the operating cycle, gate 20 releases the receiving sheet so that it can be moved through transfer station 16 to receive an image from the rotating drum 10. The receiving sheet continues through fusing rolls 21 to the exit apparatus 22. Should the duplexing function be selected, the receiving sheet will be diverted from exit apparatus 22 into duplex bin 23 from which it is fed back into the copy paper path to receive the image of an original on the opposite side of the sheet.

B. The Dual Motor Aligner

Figure 2:
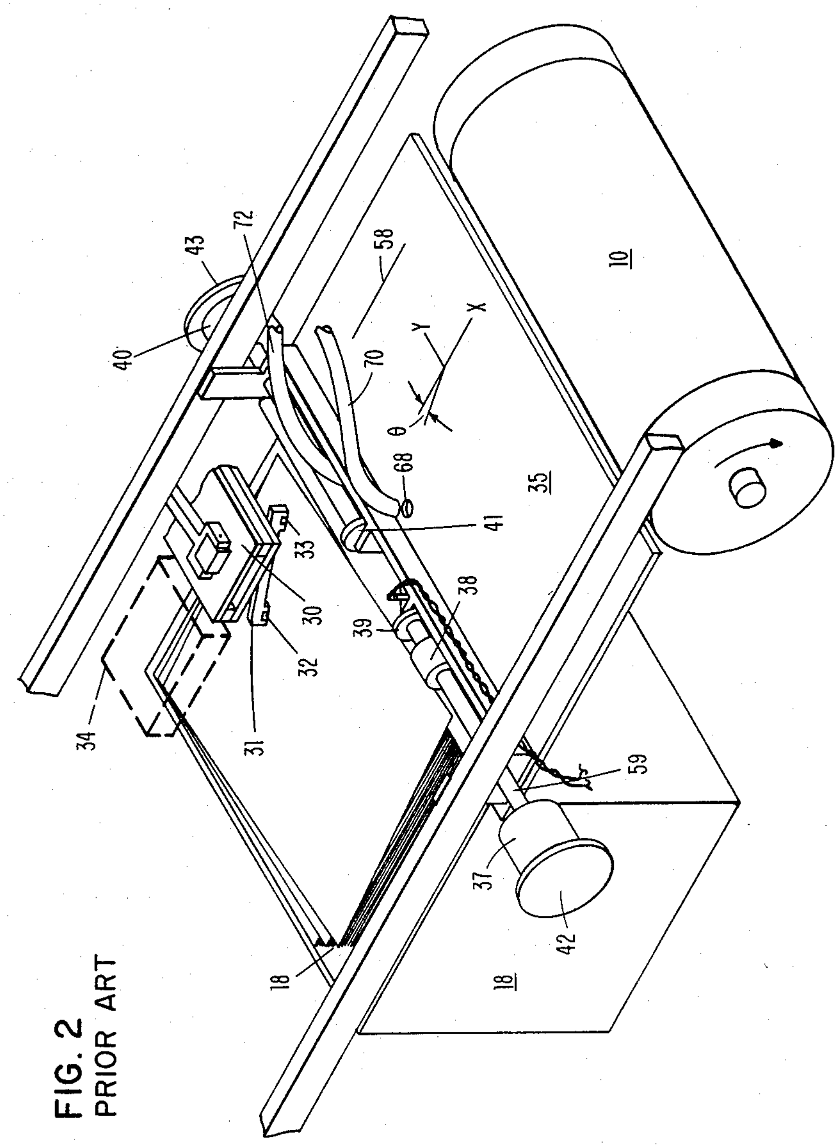
FIG. 2 PRIOR ART
FIG. 2 shows a copy paper path with a dual motor aligner.

FIG. 2 shows the dual motor alignment mechanism which is the subject of U.S. Pat. No. 4,438,917, incorporated herein by reference as mentioned above. The description to follow is in many respects the same as the description in that patent and does not describe the method and means of the instant invention.

The dual motor alignment mechanism can be incorporated into the copy paper path shown in FIG. 1 by removing the gate 20 which is no longer needed and moving a sheet from any one of bins 18, 19, or 23 into the transfer station 16 through dual motors 37 and 40 shown in FIG. 2. FIG. 2 is a pictorial view of the dual motor aligner and associated mechanisms disposed relative to the photoconductive drum 10 of an electrophotographic machine. The function of the sheet handling apparatus shown in FIG. 2 is to remove sheets in sequential order from a stack, align each sheet in the $\theta$, Y, and X coordinates and then gate each sheet into proper timed relationship with the position of the toned image on the rotating drum. A paper supply tray 18 includes an elevator mechanism, not shown, which adjusts the height of the topmost sheet on the stack in contact with sheet separating means. While any number of conventional sheet separating and forwarding means can be used, the particular sheet separating device shown in FIG. 2 is a rotary shingler 30. The rotary shingler 30 includes an elongated member 31 which has a plurality of free-rolling members 32 and 33. The rotary shingler 30 is driven so that the elongated member 31 and its attached free-rolling wheels 32 and 33 move onto the stack of sheets in bin 18 and move the sheets from the stack at an angle. As the topmost sheet is removed, a sheet restraining device 34 restrains the other sheets.

A paper transport path includes a lower guide plate 35 for guiding the separated sheet from the paper tray to the transfer station at drum 10.

A DC servo controlled motor 37 is connected to rotate drive rollers 38 and 39. Note that the outer surface of drive roller 38 is substantially greater than that of drive roller 39. The wide surface area on drive roller 38 is utilized for pulling a sheet from bin 18 after the leading edge of the sheet is positioned between the feed nip formed by the drive roller 38 and an adjustable backup roller (not shown). Since the feed nip is relatively wide, the sheet does not deviate from its initial skew angle, $\theta$.

A second DC servo controlled motor 40 is positioned on the opposite side of the paper path and is connected to rotate drive roller 41. The feeding and aligning of the sheet is performed by drive rollers 39 and 41 coacting with backup rollers (not shown). To summarize to this point, the feed nip formed between feed roller 38 and its backup roller pulls the topmost sheet from tray 18 and after the sheet is moved a predetermined distance downstream, the backup roller is moved away from drive roller 38 leaving a stationary sheet positioned in the open nip of drive roller 39 and its associated backup roller (not shown). At this time the sheet has also been positioned in an open nip between drive roller 41 and its associated backup roller. Thereupon, these latter nips are closed and motors 37 and 40 are energized in order to rotate drive rolls 39 and 41 to align and gate the sheet to the transfer station. For further detail, refer to FIGS. 1 and 2 of U.S. Pat. No. 4,438,917.

Position encoders 42 and 43, that is, tachometers, are mounted on each of the DC servo controlled motors 37 and 40. The function of the tachometers is to measure the angular position and the direction in which the DC motor is rotating.

A pair of sensing devices are located along the copy paper path one of which is shown at 68. The function of the sensing devices is to sense the presence or absence of a sheet as it is transported along the paper path. Sensor 68 can be any conventional sensor such as an optical sensor or a pneumatic sensor. The sensors are mounted in the paper path so that a line interconnecting the center point of the sensors is inclined to imaginary side reference line 58. It should be noted at this point that line 58 is an imaginary reference edge against which a sheet is squared before it is gated onto photoconductor drum 12 according to the teachings of U.S. Pat. No. 4,438,917. Stated another way, all misalignment parameters are referenced relative to line 58. Connectors 70 and 72 connect to the sensors and to control mechanisms, not shown, for transporting data revealing actuation of the sensors.

In operation, a stack of sheets is loaded into tray 18 and rotary shingler 30 contacts the topmost sheet to move the same at an initial angle from the stack. The leading edge of the sheet is moved into a sensor, not shown, which generates a signal to remove the shingler 30 from contact with the stack. As the shingler is removed, the restraining device 34 contacts the stack to prevent movement of the other sheets from the stack. At this point in the feed cycle, the topmost sheet sits in line with feed roller 38. Its backup roller is activated to move upwardly to clamp the sheet between its surface and that of feed roller 38. Servo controlled motor 37 is activated to move the sheet into the paper transport path after which the backup roller to drive roller 38 is moved downwardly allowing the sheet to be driven along the paper path by the drive nip formed by drive rollers 39 and 41 and their respective backup rollers. The sensors activating connectors 70 and 72 are utilized to measure the timing relationship associated with the sheet and a controller adjusts the velocity of servo motors 37 and 40 so that the skew angle $\theta$, the vertical alignment, (dimension Y) and the horizontal alignment, (dimension X) associated with the sheet are correct. After completion of the correction, the sheet is in edgewise alignment with the imaginary reference edge 58 and the leading edge of the sheet is gated by the drive rolls 39 and 41 into the transfer station to mate with the leading edge of an image.

The manner of correcting the position of the sheet will be briefly explained with reference to FIG. 3. A sheet 100 is caused to move in direction A by motors 37 and 40 driving rolls 39 and 41. Sheet 100 is moved in direction A at a particular skew angle, $\theta$, which may be, for example, 10 degrees. As sheet 100 moves in direction A, the leading edge 101 comes into contact with sensors 68 and 68'. Should leading edge 101 strike these sensors simultaneously, sheet 100 will be exactly at the nominal skew angle. However, if sensor 68' is activated prior to sensor 68, this would indicate a different skew angle. Since the velocity of the sheet 100 in the A direction is known, timing the difference between activation of the two sensors 68 and 68' provides information needed to calculate the exact amount of skew in sheet 100. That calculation is performed by programmable logic means such as a microprocessor to produce corrective factors which may be stored for use in controlling motors 37 and 40. In that manner, the speed of motor 40 may be accelerated and the speed of motor 37 decelerated in order to rotate sheet 100 the precise amount needed to correct for the skew so that sheet 100 is sent in a square pattern down the length of lower guide 35 into the transfer station.

The amount of deviation of side edge 102 from a coincident relationship with the imaginary side reference edge 58 can also be calculated from sensor 68'. Note again in FIG. 3 that as sheet 100 moves across sensor 68', the leading edge of the sheet activates that sensor and as the sheet continues to move the sensor will be deactivated when side edge 102 crosses sensor 68'. Again, by knowledge of the constant velocity movement in direction A, measurement of the length of time that sensor 68' is covered by sheet 100 produces a measurement of the position of sheet 100 in the Y dimension. For example, if sensor 68' is crossed by sheet 100 close to the corner of sheet 100, the sensor 68' will be activated for a relatively short period of time whereas if sheet 100 is closer to edge 103 of the paper path, sensor 68' will be covered a longer period. After programmable logic means calculates the position of sheet 100 in the Y dimension, corrective action is taken by motors 37 and 40 to achieve the desired position.

Correction in the Y dimension occurs by beginning the skew angle correction at a different point in the movement of sheet 100 in direction A. Referring again to FIG. 3, note rollers 41 and 39 in solid outline relatively near the leading edge 101 of sheet 100 as compared to the position of these same rolls at 41' and 39'. Actually, of course, the position of the rolls do not change but what is intended to be illustrated here is that the position of the rolls relative to the sheet changes as sheet 100 moves in direction A. The point is, that if the skew angle correction is commenced when the rollers are near leading edge 101, side edge 102 will assume a different position than it does when the skew angle correction is begun when the drive rollers are at positions 41' and 39'. By calculating the time at which the skew angle correction begins, side edge 102 can be made to align accurately with the imaginary reference edge 58.

In order to accomplish synchronism in the X dimension, drive rollers 39 and 41 are caused to move at a relatively fast speed during the initial paper movement period. If that speed continued, the sheet 100 would be brought into the transfer station too soon to mate the leading edge of the sheet to the leading edge of the image, and would be moving too fast to synchronize with photoreceptor speed. Therefore, at the appropriate point to mate the leading edge 101 with the leading edge of the image, the speed on rollers 39 and 41 is dropped to match photoreceptor speed so that the sheet 100 moves at the correct velocity into the transfer station at exactly the right time to mate the leading edges. That correct time is determined from the times at which leading edge 101 crosses sensors 68 and 68'.

The referenced patent application, U.S. Pat. No. 4,438,917 describes the equations used for calculating the necessary time period to accomplish skew angle correction, correction in the Y plane and the correction in the X plane. Those equations are as follows:

$$t_r = A(i_2 - i_1) + B, \quad (1)$$

$$t_y = C(i_2 - i_1)^3 + D(i_2 - i_1)^2 + E(i_2 - i_1) + F \quad (2)$$

$$t_6 = G(i_3 - i_2) + Ht_r + It_y + Jt_r^2 + Kt_r(i_3 - i_2 + Lt_r t_y + Mt_r^3 + Nt_r^2(i_3 - i_2) + Pt_r^2 t_y + Q. \quad (3)$$

The values $i_1$, $i_2$ and $i_3$ are the time measurements associated with paper actuation of the sensors 68 and 68', with time zero being the actuation of drive motors 37 and 40 after the nips 39 and 41 are closed. These times are recorded by the microcomputer. The value of the constants A, B, C, D, E, F, G, H, I, J, K, L, M, N, P and Q are obtained theoretically from the geometry of the paper path. These values are stored in the microprocessor and the microprocessor utilizes the value of the stored constant together with time periods $i_1$, $i_2$ and $i_3$ to calculate the needed values of $t_r$, $t_y$ and $t_6$. Once these values are calculated, the microprocessor interrogates the velocity profile and generates the velocity pulses for the time calculated.

C. The Invention

In the dual motor aligner as described above and as more completely set forth in the referenced patent, it is presumed that the image of an original is always side edge referenced at the same location on the photoreceptor. Thus, imaginary reference edge 58 in the copy paper path is placed in alignment with that location presumed for the side edge of the image. To achieve accurate image positioning, this system requires accurate positioning of the original on the document glass, it requires an accurately and squarely positioned reference edge on the document glass, it requires precision optics so as not to shift the image, and it requires close tolerance mechanisms for holding photoreceptor position on a drum or belt arrangement. The invention, herein, about to be described, avoids the need for all of these requirements thus providing significant savings in the manufacturing process.

In the specific embodiment to be described, the instant invention makes use of the paper maneuvering capabilities of a mechanism such as the dual motor aligner to avoid the need for close manufacturing tolerances. In its basic form as used in a document copier machine, the invention calls for placing a master original carrying positional data on the document glass and a master target image receiving sheet with positional data in the paper feed. A copy of the master is then run to copy its information onto the master receiving sheet. In a printer version, the original master positional data is printed onto the photoreceptor by an electronically controlled printhead as is well known in the art.

Figure 4:
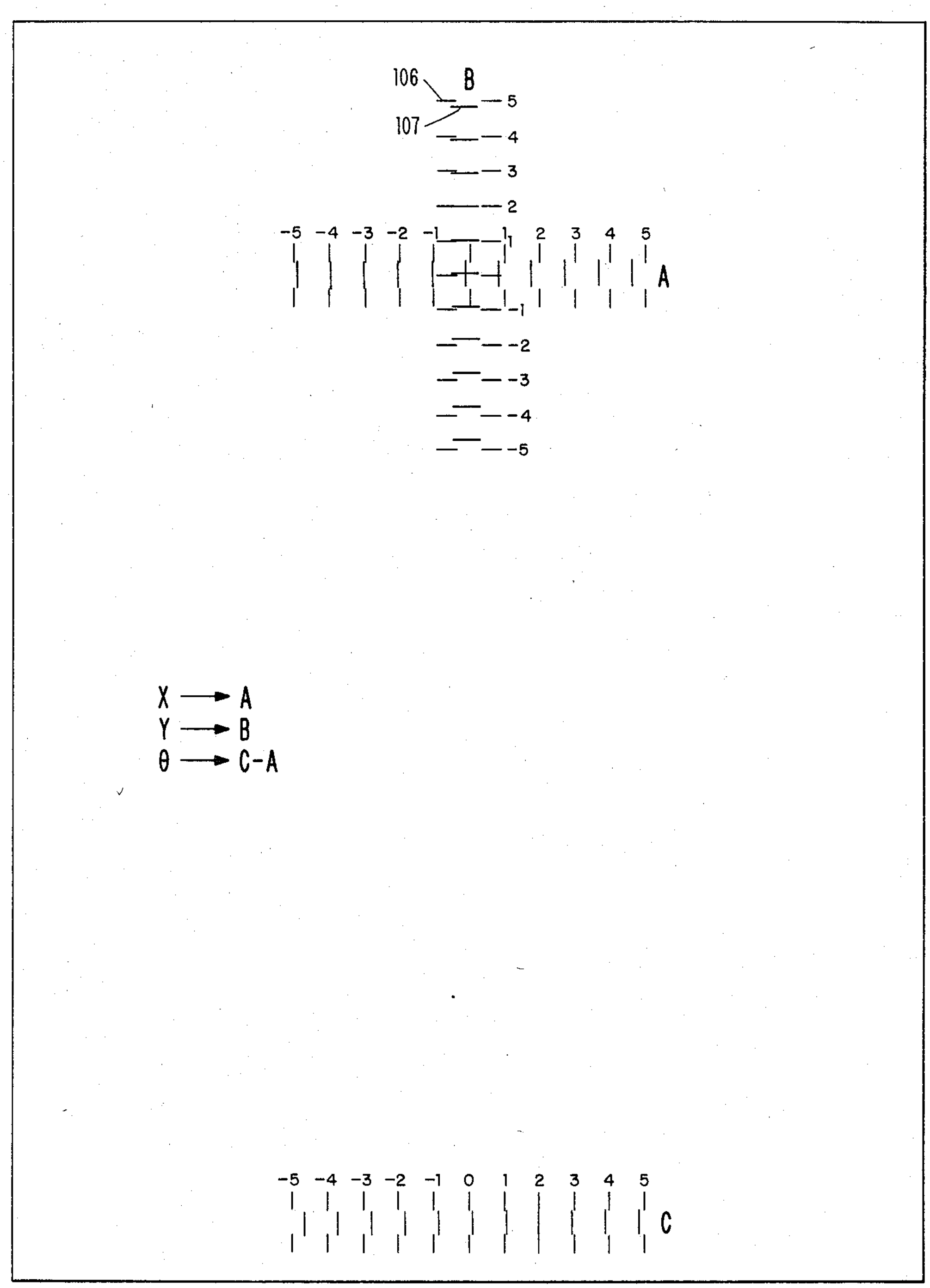
FIG. 4 shows the vernier calibrations resulting from an original master and an image receiving master in order to develop correction factors for positioning receiving sheets in accordance with the position of the original.

An example of a result where the two masters contain vernier data is shown in FIG. 4. For example, the split vernier lines with the numbers 1, 2, 3, 4, 5 could be located on the master receiving sheet while the short middle line could be located on the original master. The cross hair at the center of verniers A and B would probably be located on the original master in this example with the split cross hairs located on the master receiving sheet. For point of reference along vernier B, the split outer vernier line at 5 is marked 106 while the short interior vernier line is marked 107. In viewing column B note that the vernier lines 106 and 107 line up along reference numeral 1. In viewing column A note that the outer and inner verniers line up across reference numeral −2. At the bottom of the sheet, column C shows that the outer and inner verniers line up at a +2.

Interpretation of the vernier information is as follows. If the image of the original and the master receiving sheet matched perfectly, the cross hairs in columns A and B would line up perfectly with the zero readings of the outside vernier scale and in column C the outer and inner verniers would also line up at zero. In the illustration shown, the verniers line up at a +1 on column B indicating that a Y correction needs to be made in order to match the position of the master receiving sheet to the position of the image in the Y dimension. In column A, the verniers line up at a −1 indicating that the leading edge of the master receiving sheet reached the transfer station too quickly and an adjustment has to be made in order to gate the receiving sheets properly.

By comparing the reading at the top of the paper in column A to the reading at the bottom of the paper in column C, the amount of skew can be calculated by subtracting the reading at column A from the reading at column C.

While other types of target masters could be used the above example using verniers provides the needed information to adjust the time factors named in the equations above in order to provide a correct positioning of the receiving sheet to the image. In order to utilize the information developed from the vernier, the operator on the manufacturing line may utilize the keyboard 26 (FIG. 1) on the control panel of the machine to enter the numbers A, B, and C into the machine and into the microprocessor. The processor then utilizes that entered information to calculate the required changes.

Figure 5:
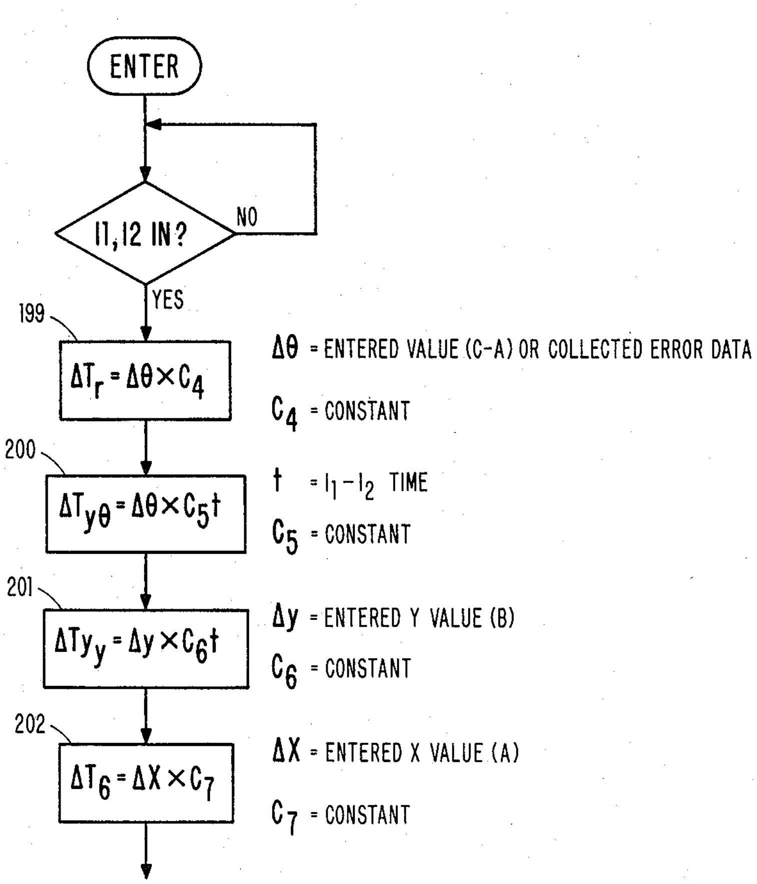
FIGS. 5 and 6 are flowcharts of microprocessor operation to implement various aspects of the instant invention.

FIG. 5 shows the calculation performed by the processor to generate the corrections. It may be noted that when correcting skew angle, that correction must also be considered when correcting for the Y dimension. Consequently, at step 200 a change in the Y dimension for the amount of skew is calculated and in step 201 a change in the Y dimension for the desired Y change is calculated.

To complete the calculation, the change factors determined in steps 199 through 202 in FIG. 5 are added to the nominal time periods obtained through the application of the formulae 1, 2 and 3 set out above. Consequently, the final time periods are provided from the processor through application of the three formulae directly below.

$$T_{rf} = T_r + \Delta T_r \quad (4)$$

$$T_{yf} = T_y + \Delta T_y + \Delta T_{y\theta} \quad (5)$$

$$T_{6f} = T_6 + \Delta T_6 \quad (6)$$

Thus, there has been described a technique for setting up a machine from the assembly line to electronically adjust the paper path so that the receiving sheet will arrive at the transfer station to exactly mate with the image produced from an original on the document glass. This is done without tedious, time-consuming and expensive mechanical adjustment of the optical system, document handler, document glass and reference edges at the document glass.

Figure 3:
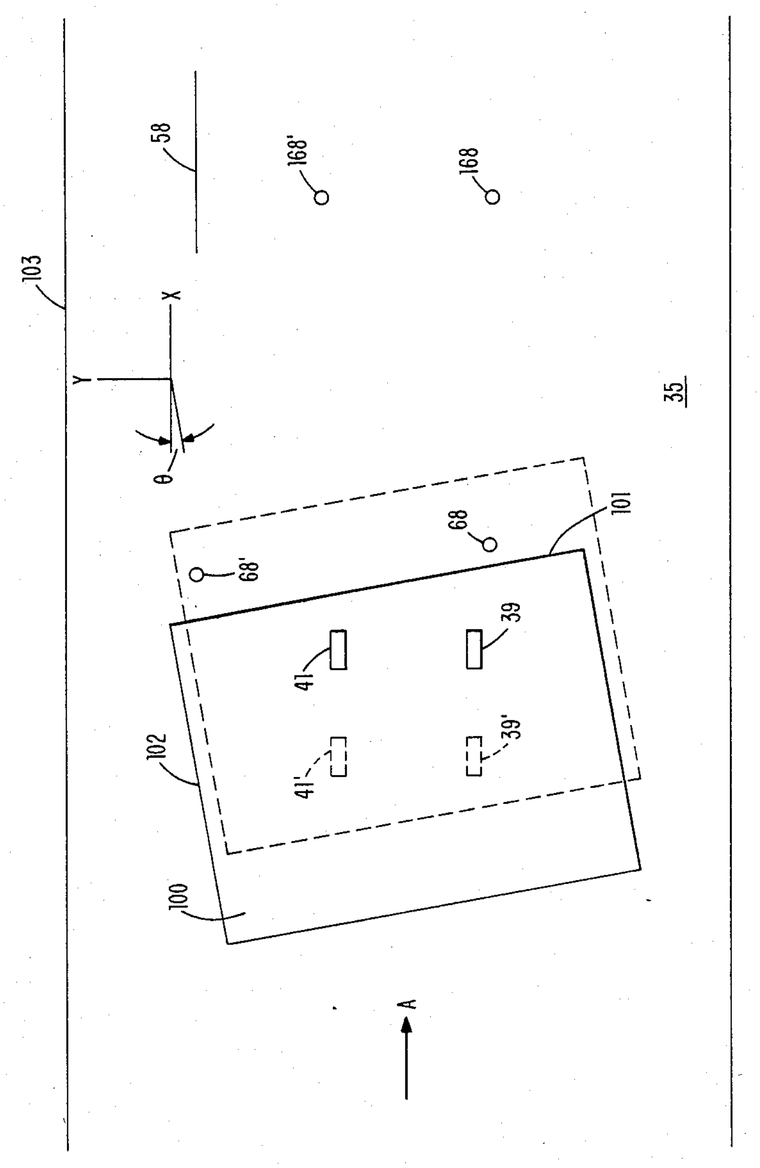
FIG. 3 is an illustration of a receiving sheet in the copy paper path passing by sensors in order to develop the needed information for controlling the dual motor aligner.

As a further refinement, the machine can be equipped with an additional pair of sensors 168 and 168' as shown in FIG. 3. These downstream sensors sense the position of sheet 100 prior to the time that sheet 100 reaches the transfer station. In that manner, a feedback arrangement can be provided so that error in the gating of sheet 100 can be detected and the $\Delta T_6$ altered to create the needed adjustment. Should the leading edge 101 of sheet 100 strike sensor 168 prior to 168', the development of a skew angle error would be indicated and that information can be used to alter the $\Delta T_r$ calculation in order to correct for the skew. Sensors 168 and 168' would not be capable of feeding back information to take corrective action in the Y dimension should an error develop there. Additional sensors could be added to sense the position of the side edge of the receiving sheet. Use of the information developed at sensors 168 and 168' is analogous to the vernier information described above but may be fed directly to the microprocessor without operator intervention.

Figure 6:
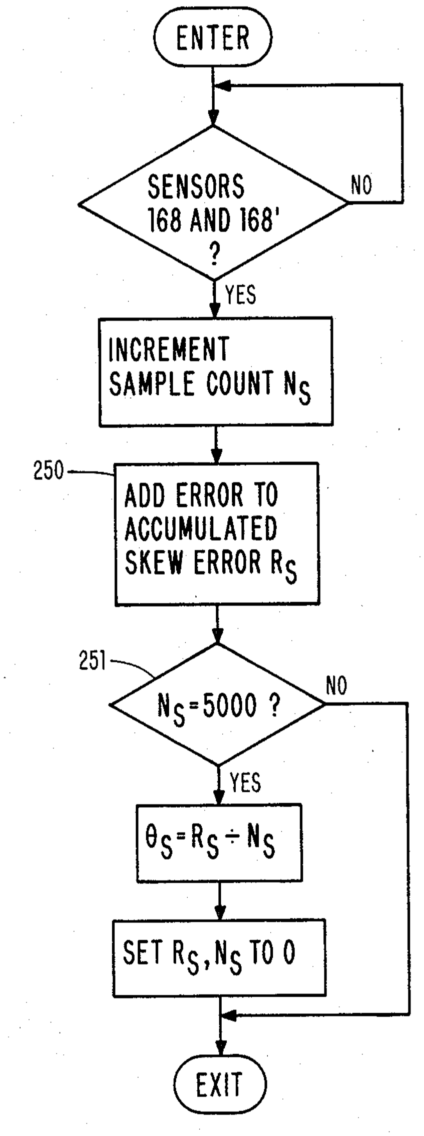

FIG. 6 shows a preferred implementation for utilizing the information derived from downstream sensors 168 and 168'. In the technique shown in FIG. 6, the skew angle error for each sheet at the downstream sensors is accumulated at step 250 but no change is made in the basic skew angle correction made by the dual motor aligner motors 37 and 40. Instead, the error is accumulated over a desired number of receiving sheets flowing past the downstream sensors. When the count of the number of sheets $N_s$ equals a desired sample, that is, when $N_s$ equals 5000 at step 251, the accumulated error is divided by the number of sheets in the sample and that figure is used to correct the skew angle according to the techniques previously described. A similar technique to that shown in FIG. 6 for the correction in the X dimension can also be made in order to remove any accumulated error in gating the leading edge of the document to the leading edge of the image. Obviously, the number of sheets in the sample can be 5000 or any other number as desired.

The dynamic error correcting technique may also be applied to the location of the original document on the document glass. Obviously, if the location of the original document varies, the location of the image will change and there will be a need to correct the position of the receiving sheet to match the new location of the image. That can be accomplished with the mechanism shown in FIG. 7.

Figure 7:
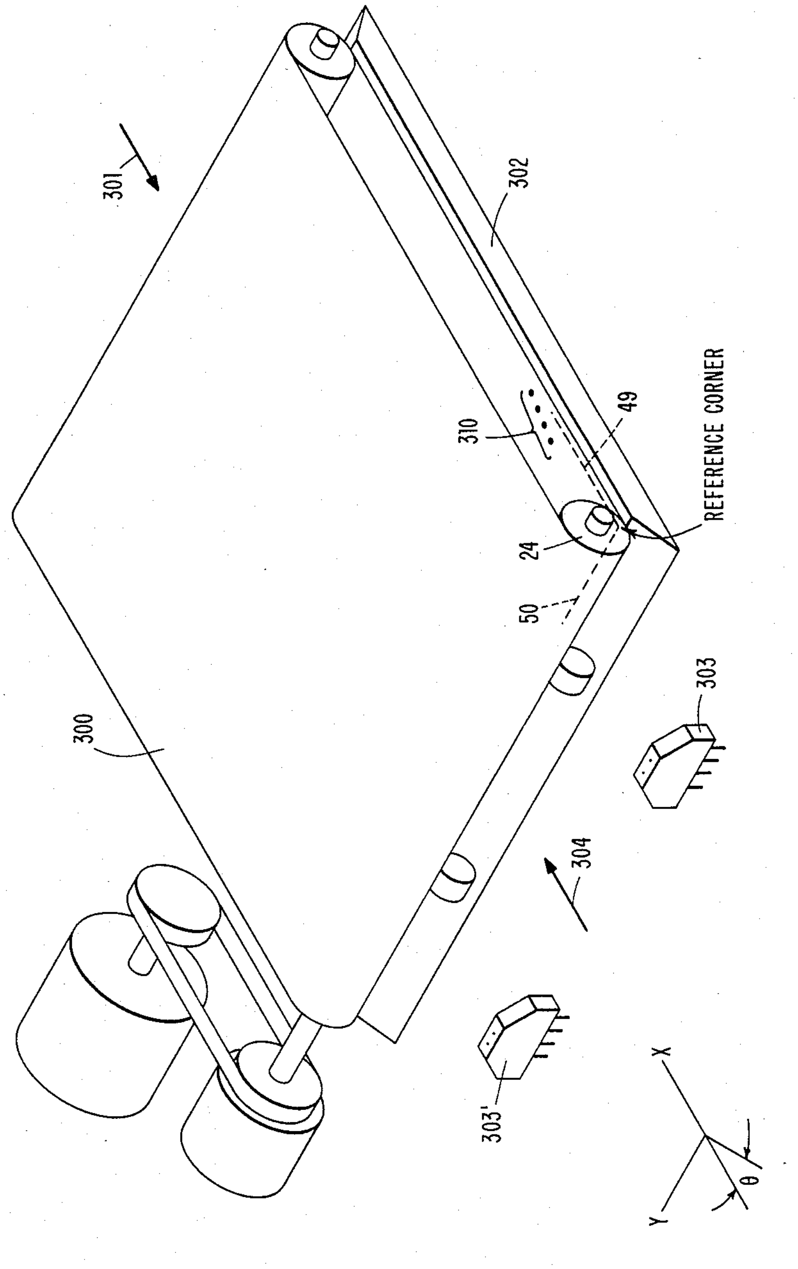
FIG. 7 shows a document feeder with sensors for providing information to develop correction factors in accordance with placement of original documents.

In FIG. 7 an original document positioning mechanism is shown which may be a part of a semiautomatic document feeder and/or a part of an automatic document feeder including a recirculating automatic document feeder. A vacuum transport belt 300 is driven by drive roll 24 to move documents in a direction 301 from an input side across a glass platen 302 to the exit side. When positioning a document, the leading edge of the document is passed beyond the exit edge of the glass to sensors 303 and 303'. The original document is then reversed and moved back onto glass platen 302 with the extent of the movement determined by the moment at which the edge of the document moves past sensors 303 and 303' in direction 304. In that manner, the corner of the document is positioned at the reference corner defined by imaginary lines 50 and 49. Obviously, this technique requires careful placement of the original document onto the vacuum transport belt 300 such that the corner of the document will align with the imaginary reference corner defined by lines 50 and 49.

In order to eliminate the need for such careful placement of an original document on the document transport belt 300, information from sensors 303 and 303' can be used to modify the action of the dual motor aligner so that the position of the copy paper is corrected to match whatever deviations are present in the placement of an individual document on the document glass. That is to say, if a skew is present in the original document, sensors 303 and 303' will be activated at different points in time as the leading edge of the document first reaches these sensors. Since the skew angle of the document will not change because it is held in place by the vacuum system, this information can be used to calculate a correction factor to the skew angle measure utilized by the dual motor aligner. This correction factor is determined using the same procedures already outlined above with reference to FIG. 5. In that manner, the copy sheet can be entered into the transfer station at a proper skew so that the skewed image resulting from the skewed original document is mated to a matching skewed receiving sheet.

Figure 8:
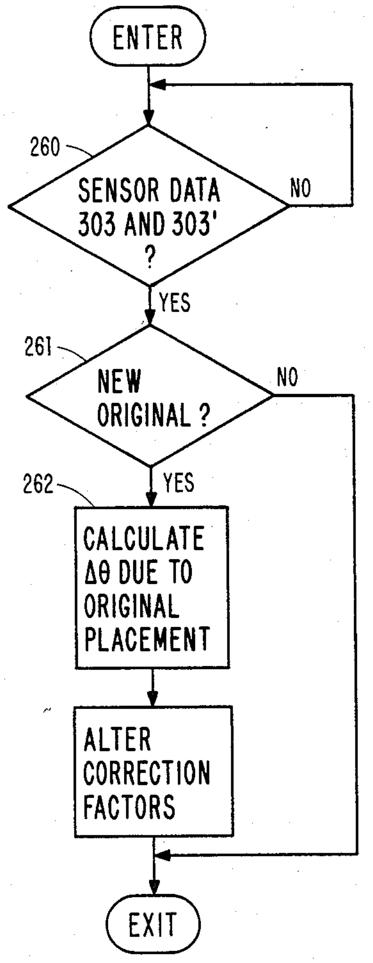
FIG. 8 shows the correction of skew angle on a case-by-case basis.

FIG. 8 shows how information from sensors 303 and 303' can be used by the microprocessor to correct the skew angle on a case-by-case basis in the copying process. At step 260, the processor queries the sensors and at step 261 determines whether this data represents data for a new original on the document glass. With those determinations, an incorrect skew angle is sensed and a correction factor is calculated in the same manner as performed at step 199 in FIG. 5. This is done at step 262 after which the skew angle measure is altered in the same manner as described above. The technique shown in FIG. 8 will correct on a case-by-case basis the placement of receiving sheets entering the transfer station to accommodate skew in the placement of the original on the document glass.

If desired, the information from sensors 303 and 303' may be passed through a process such as shown in FIG. 6 where error data is accumulated for a specific number of new original before a correction is made to the placement of receiving sheets at the transfer station. This latter technique might be useful to accommodate changes in the document feeding system due to wear, for example.

What has been provided in FIG. 7 is a technique for eliminating the need for careful placement of originals on the document glass in relation to skew angle. The technique described can be extended to include additional sensors 310 for taking measurements in the Y dimension so that correction factors can be developed for that dimension as well. As shown in FIG. 7, sensors 310 are slightly offset one from another in the Y dimension thus enabling accurate sensing of the deviation of the side edge of the original from reference 49. Correction in the X dimension, leading edge registration, can be derived from a sensor at line 50 or from a tachometer on the drive motor of belt 300.

Note in FIG. 1 that three different copy paper bins are utilized to feed paper to the transfer station in that particular machine. In utilizing the techniques of the instant invention, the operator on the manufacturing line would place the master receiving sheet in one of the three bins for comparison to the original master, and then repeat the process for the other bins so that vernier adjustments can be observed for each of the three copy paper bins individually. In that manner, different correction factors depending on which copy paper bin is in use can be utilized to drive the dual motor aligner in an individualized fashion so that sheets can be mated to the image regardless of the bin from which the sheet originates.

Also, if a machine has the capability of moving a document onto the document glass in more than one mode, different correction factors may be needed for the placement of the original due to differences in each of these modes. To illustrate, suppose that the machine shown in FIG. 1 has a combined recirculating automatic document feed and a semiautomatic document feed together with the capability of manual placement of a document on the document glass. In this case, in order to completely set up the machine on the manufacturing line, a master original document would be placed in the recirculating automatic document feed and a master receiving sheet in bin 18. A copy would be made providing the operator the factors A, B, and C which are inserted into the machine through the keyboard as previously described. Next, the same procedure would be utilized except that the master receiving sheet would be placed in bin 19. A duplex operation would be run so that the factors A, B, and C could be calculated for the delivery,, of the copy sheet to the transfer station from bin 23. Next, correction factors A, B, and C are obtained for the case where the SADF is used to move the master orignal to the document glass. Once again, the master receiving sheet would be placed 18 for the generation of factors A, B and C. Next, the procedures would be excercised with the master receiving sheet placed in bin 19. Finally, the correction factors for lines 18 and 19 could be developed for manual placement of the original master.

With all of the above information loaded into memory associated with the microprocessor, the machine would be completely aligned. If the machine is also equipped with downstream sensors such as previously described and/or with sensors at the document feed, the machine could make dynamic changes throughout its life.

While the invention has been particularly shown and described with reference to a preferred embodiment thereof, it will be understood by those skilled in the art that the invention could also be used to align machines in which photoreceptive paper is used in the copy process and that the invention is usable in any machine when the requirement is to move paper to a processing station in an accurate position for work. These and other changes in form and details may be made therein without departing from the spirit and scope of the invention.

What is claimed is:

1. An image producing machine including means for electronically aligning components of said machine for producing a nominally correct position at which image receiving sheets serially fed through said machine are properly aligned with images serially produced by said machine, comprising:
   - a processing station;
   - drive means for moving a receiving sheet through said processing station;
   - means for producing an image on said receiving sheet;
   - means for developing said image;
   - aligning means for electronically aligning components of said machine to adjust the relative position of said image and said image receiving sheet;
   - control means including programmable logic means connected to said aligning means to cause said aligning means to set up said machine to define a nominally correct position whereat images and image receiving sheets are properly aligned one with the other for subsequent production, said set up in accordance with a measure of alignment of the position of said image on said receiving sheet; and
   - entering means for introducing said measure of alignment into said control means.

2. The machine of claim 1 wherein said means for producing an image include printhead and print control means to produce said master pattern as an image.

3. The machine of claim 2 wherein said measure of alignment includes a measure of skew angle error between said image and said receiving sheet, said measure of skew angle error for altering the output of said programmable logic means to eliminate said skew angle error.

4. The machine of claim 2 wherein said measure of alignment includes a measure of side edge error between said image and said receiving sheet, said measure of side edge error for altering the output of said programmable logic means to eliminate said side edge error.

5. The machine of claim 2 wherein said measure of alignment includes a measure of leading edge error between said image and said receiving sheet, said measure of leading edge error for altering the output of said programmable logic means to eliminate said leading edge error.

6. The machine of claim 2 wherein said measure of alignment between said image and said receiving sheet includes three separate alignment measures, a first measure for skew angle error, a second measure for side edge error and a third measure for leading edge error, said three alignment measures for altering the output of said programmable logic means to change the relative position of images and receiving sheets subsequently delivered to said processing station to eliminate the errors.

7. The machine of claim 6 further including a plurality of receiving sheet feeding mechanisms and wherein separate measures of alignment are produced for each of said sheet feeding mechanisms.

8. The machine of claim 6 further including duplex path mechanisms to return receiving sheets to said processing station and wherein separate measures of alignment are produced for the production of duplex copies.

9. The machine of claim 6 further including sensing means located downstream from said drive means for sensing the position of receiving sheets after alignment and to sense for the continued presence of errors in alignment, said sensing means connected to said programmable logic means for automatically entering sensed data and for further altering the output of said programmable logic means in accordance with an average of said continued errors over a predetermined sample number of receiving sheets.

10. The machine of claim 1 wherein said means for producing an image includes a document glass, a light source means and an optical system.

11. The machine of claim 10 wherein said measure of alignment includes a measure of skew angle error between said image and said receiving sheet, said measure of skew angle error for altering the output of said programmable logic means to eliminate said skew angle error.

12. The machine of claim 10 wherein said measure of alignment includes a measure of side edge error between said image receiving sheet, said measure of side edge error for altering the output of said programmable logic means to eliminate said side edge error.

13. The machine of claim 10 wherein said measure of alignment includes a measure of leading edge error between said image and said receiving sheet, for altering the output of said programmable logic means to eliminate said leading edge error.

14. The machine of claim 10 wherein said measure of alignment between said image and said receiving sheet includes three separate alignment measures, a first measure for skew error, a second measure for side edge error and a third measure for leading edge error, said three alignment measures for altering the output of said programmable logic means to change the relative position of images and image receiving sheets subsequently delivered to said processing station to eliminate the errors.

15. The machine of claim 14 further including a plurality of receiving sheet feeding mechanisms and wherein separate measures of alignment are produced for each of said sheet feeding mechanisms.

16. The machine of claim 14 further including duplex path mechanisms to return sheets to said processing station and wherein separate measures of alignment are produced for the production of duplex copies.

17. The machine of claim 14 further including an auto matic mode and an automatic document feeder for automatically positioning original documents on said document glass and a manual mode providing for manual placement of original documents on said documents glass and wherein separate measures of alignment are produced for each of said modes.

18. The machine of claim 14 further including a semiautomatic mode and a semiautomatic document feeder for positioning original documents on said document glass and a manual mode providing for manual placement of original documents on said document glass and wherein separate measures of alignment are produced for each of said modes.

19. The machine of claim 14 further including sensing means located downstream from said drive means for sensing the position of receiving sheets after alignment in order to sense for the continued presence of errors in alignment, said sensing means connected to said programmable logic means for automatically entering sensed data for altering the output of said programmable logic means in accordance with an average of said continued errors over a predetermined sample number of receiving sheets.

20. The machine of claim 14 further including document feeding mechanism means for feeding an original document to a nominal desired position on said document glass, and sensor means for sensing document skew angle error, if any, from the nominal desired position for producing a correction factor for said measure of skew angle error, said sensor means connected to said programmable logic means for entering sensed data for altering the output of said programmable logic means to change the position of a receiving sheet destined to receive an image of said original document to dynamically and electronically compensate for the mispositioning of said document on said document glass from said nominal desired position.

21. The machine of claim 20 further including second sensor means to sense the side edge position of said document at a nominal desired position on said document glass to produce a correction factor for said measure of side edge error, said second sensor means connected to said programmable logic means for automatically entering sensed data for altering the output of said programmable logic means to change the position of a receiving sheet destined to receive an image of said original document to dynamically and electronically compensate for the mispositioning of said document on said document glass from said nominal desired position.

22. The machine of claim 14 further including document feeding mechanism means for serially feeding original documents to a nominal desired position on said document glass, and sensor means for sensing the position of the document skew angle error for producing a correction factor for said measure of skew angle error, said sensor means connected to said programmable logic means for entering sensed data for altering the output of said programmable logic means in accordance with an average of said error over a predetermined sample number of receiving sheets.

23. The machine of claim 14 further including document feeding mechanism means for feeding an original document to a nominal desired position on said document glass and sensor means for sensing the side edge position of said document, said sensor means connected to said programmable logic means for automatically entering sensed data for altering the output of said programmable logic means to change the position of a receiving sheet destined to receive an image of said original document to dynamically and electronically compensate for the mispositioning of said document on said document glass from said nominal desired position.

24. An electrophotographic machine comprising:
- a photoreceptive surface;
- mounting means for said photoreceptive surface;
- an exposure station;
- drive means for moving said photoreceptive surface through said exposure station;
- means for producing an image on said photoreceptive surface at said exposure station;
- means for developing said image; and
- aligning means for electronically aligning a copy sheet to receive said image, said aligning means including programmable logic means, and further including sensor means for sensing the position of all copy sheets after alignment to sense for the continued presence of errors in alignment to produce correction factors for further altering the output of said programmable logic means in accordance with an average of said continued errors over a predetermined sample number of copy sheets.

25. An electrophotographic copier machine comprising:
- a photoreceptive surface;
- mounting means for said photoreceptive surface;
- an exposure station;
- drive means for moving said photoreceptive surface through said exposure station;
- means for producing an image on said photoreceptive surface at said exposure station;
- means for developing said image;
- aligning means for electronically aligning a copy sheet to receive said image, said aligning means including programmable logic means and drive rolls under the control of said logic means;
- a document glass;
- a document feeding mechanism for feeding an original document to be copied to a nominal desired position on said document glass; and
- sensor means for sensing the position of the document side edge for producing a measure of document side edge position, said sensor connected to said programmable logic means for automatically entering said measure into said programmable logic means for altering the output of said programmable logic means to change the position of a copy sheet destined to receive an image of said original document to dynamically and electronically compensate for the mispositioning of said document on said document glass from said nominal desired position.

26. The machine of claim 25 further including sense means for sensing the position of the document skew angle for producing a correction factor if said document skew angle is incorrect for altering the output of said programmable logic means to change the position of a copy sheet destined to receive an image of said original document to dynamically and electronically compensate for the mispositioning of said document on said document glass from said nominal desired position.

27. The machine of claim 26 further including sensor means for sensing the position of the document leading edge for producing a correction factor if said document leading edge is mispositioned for altering the output of said programmable logic means to change the position of a copy sheet destined to receive an image of said original document to dynamically and electronically compensate for the mispositioning of said document on said document glass from said nominal desired position.

28. A method for electronically aligning components of the copy paper path of an electrophotographic machine to cause image receiving sheets to properly align with an image comprising the steps of:
- producing an image of a master pattern on photoreceptive material for juxtaposition with a preprinted pattern on a master image receiving sheet;
- comparing said master pattern to said preprinted pattern to ascertain a measure of errors in the alignment of said image and said receiving sheet;

inserting said measure into programmable logic means to produce an output altered in accordamce with said measure of errrors; and thereafter controlling receiving sheet positioning means by the output of said programmable logic means to Position receiving sheets in a manner which eliminates said errors in alignment.

29. The method of claim 28 wherein said method is used to produce a first measure of alignment for the case where said receiving sheets are fed from a first feeding means.

30. The method of claim 29 wherein said first measure of alignment is produced for the case where an original document containing said master pattern is manually placed on a document glass.

31. The method of claim 29 wherein said first measure of alignment is produced for the case where an original document containing said master pattern is placed on said document glass by a semiautomatic document feeder.

32. The method of claim 29 wherein said first measure of alignment is produced for the case where an original document containing said master pattern is placed on said document glass by an automatic document feeder.

33. The method of claim 29 wherein a second measure of alignment is produced for the case where said receiving sheets are fed from a second feeding means.

34. The method of claim 29 wherein a third measure of alignment is produced for the case where the second side of a duplex copy is produced.

35. A method for electronically aligning the components of an image producing machine so that image receiving sheets are properly aligned with an image comprising the steps of:

producing an image on an image receiving sheet;

ascertaining the position of said image on said sheet to produce a measure of error in the alignment of said image and said receiving sheet;

inserting said measure of alignment into programmable logic means to produce an output altered in accordance with said measure; and utilizing the output of said programmable logic means to control means for electronically adjusting the components of said machine to a nominally correct position at which the relative position of said image and image receiving sheet are in correct alignment for subsequent machine operation.

36. The method of claim 35 wherein said method is used to produce a first measure of alignment for the case where said receiving sheets are fed from a first feeding means.

37. The method of claim 36 wherein said first measure of alignment is produced for the case where an original document containing said master pattern is manually placed on a document glass.

38. The method of claim 36 wherein said first measure of alignment is produced for the case where an original document containing said master pattern is placed on said document glass by a semiautomatic document feeder.

39. The method of claim 36 wherein said first measure of alignment is produced for the case where an original document containing said master pattern is placed on said document glass by an automatic document feeder.

40. The method of claim 36 wherein a second measure of alignment is produced for the case where said receiving sheets are fed from a second feeding means.

41. The method of claim 36 wherein a third measure of alignment is produced for the case where the second side of a duplex copy is produced.

* * * * *

UNITED STATES PATENT AND TRADEMARK OFFICE
CERTIFICATE OF CORRECTION

PATENT NO. : 4,511,242 Page 1 of 2

DATED : April 16, 1985

INVENTOR(S) : W. H. Ashbee et al

It is certified that error appears in the above—identified patent and that said Letters Patent is hereby corrected as shown below:

Column 1, line 14, delete "copy" and insert --image receiving--.

Column 1, line 15, delete "image".

Column 1, line 16, delete "receiving"first occurance, and insert --copy--.

Column 5, line 67, after "move" insert --downwardly--.

Column 7, line 19, delete "driving" and insert --which rotate drive--.

Column 8, line 24, delete "application".

Column 8, near line 35, formula (3) should read:

$$--t_6=G(i_3-i_2)+Ht_r+It_y+Jt_r^2+Kt_r(i_3-i_2)$$
$$+Lt_rt_y+Mt_r^3+Nt_r^2(i_3-i_2)+Pt_r^2t_y+Q.--$$

Column 9, line 30, delete "2" and insert --1--.

Column 12, line 49, after "delivery" delete ",,".

Column 12, line 53, after "placed" insert --in bin--.

Column 14, claim 12, line 28, after "image" insert --and said--.

UNITED STATES PATENT AND TRADEMARK OFFICE
CERTIFICATE OF CORRECTION

PATENT NO. : 4,511,242

DATED : April 16, 1985

INVENTOR(S) : W. H. Ashbee et al

It is certified that error appears in the above—identified patent and that said Letters Patent is hereby corrected as shown below:

Column 14, claim 14, line 39, after "skew" insert --angle--.

Column 14, claim 16, line 51, after "return" insert --receiving--.

Column 17, claim 28, line 2, delete "accordamce" and insert --accordance--.

Column 17, claim 28, line 6, delete "Position" and insert --position--.

Signed and Sealed this

*Twenty-second* Day of *April 1986*

[SEAL]

*Attest:*

DONALD J. QUIGG

*Attesting Officer* Commissioner of Patents and Trademarks